US008805598B2

(12) United States Patent
Shaffer et al.

(10) Patent No.: US 8,805,598 B2
(45) Date of Patent: Aug. 12, 2014

(54) DYNAMIC CONFIGURATION OF DISTRIBUTION FEEDER PARAMETERS IN A POWER GRID

(75) Inventors: Shmuel Shaffer, Palo Alto, CA (US); Nitin Nayar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 447 days.

(21) Appl. No.: 13/189,259

(22) Filed: Jul. 22, 2011

(65) Prior Publication Data

US 2013/0024043 A1 Jan. 24, 2013

(51) Int. Cl.
G05D 3/12 (2006.01)
G05D 5/00 (2006.01)
G05D 9/00 (2006.01)
G05D 11/00 (2006.01)
G05D 17/00 (2006.01)
G05B 11/01 (2006.01)

(52) U.S. Cl.
USPC .............. 700/297; 700/22; 700/286; 700/295

(58) Field of Classification Search
CPC .............. H02J 3/14; H02J 3/00; H02J 3/005; H02J 3/383; H02J 3/386; H04L 12/10; H04L 12/2803; H04L 2012/2843; G06F 1/26; G06F 1/28; G06F 8/71
USPC ............................ 700/22, 286, 291, 295, 297
See application file for complete search history.

(56) References Cited

U.S. PATENT DOCUMENTS

| 6,115,468 | A | 9/2000 | De Nicolo |
| 6,295,356 | B1 | 9/2001 | De Nicolo |
| 6,549,880 | B1 * | 4/2003 | Willoughby et al. ........... 703/13 |
| 6,671,151 | B2 * | 12/2003 | Smith et al. .................. 361/93.2 |
| 6,804,351 | B1 | 10/2004 | Karam |
| 7,084,742 | B2 * | 8/2006 | Haines ........................ 340/12.33 |
| 7,545,055 | B2 | 6/2009 | Barrass |
| 7,893,563 | B2 * | 2/2011 | Ghafurian et al. .............. 307/86 |
| 2005/0111560 | A1 * | 5/2005 | Haines ........................... 375/257 |
| 2008/0231114 | A1 * | 9/2008 | Tolnar et al. .................... 307/38 |
| 2010/0052421 | A1 | 3/2010 | Schindler et al. |
| 2010/0114387 | A1 * | 5/2010 | Chassin ........................ 700/286 |
| 2011/0264477 | A1 * | 10/2011 | Delany et al. ................ 705/7.11 |

OTHER PUBLICATIONS

SEL-351R Recloser Control, "Take Control of Your Recloser", Schweitzer Engineering Laboratories, Inc., SEL-351R Data Sheet, Jan. 13, 2009, www.selinc.com.

(Continued)

*Primary Examiner* — Ramesh Patel
(74) *Attorney, Agent, or Firm* — Edwards Wildman Palmer LLP; James M. Behmke; Stephen D. LeBarron (57) ABSTRACT

In one embodiment, a system identifies a grid topology of a plurality of distribution automation (DA) devices of a distribution feeder circuit in a power grid, and determines parameters for each of the DA devices of the distribution feeder circuit based on the grid topology e.g., protection parameters such that DA devices further from a power source in the power grid up to a normally open point (NOP) are configured to trigger protection earlier than DA devices closer to the power source. The DA devices may then be configured with respective parameters as determined, and in response to detecting a change of the grid topology, updated parameters may be determined for one or more of the DA devices based on the changed grid topology. The system then reconfigures respective parameters of each of the DA devices that have updated parameters due to the change of the grid topology.

25 Claims, 11 Drawing Sheets

(56) References Cited

OTHER PUBLICATIONS

Joon-Ho Choi et al, "Adaptive Protection Schemes of Distributed Generation at Distribution Network for Automatic Reclosing and Voltage Sags", IEEE (Jan. 9, 2009), pp. 810-815.

M. Geidl "Protection of Power Systems with Distributed Generation: State of the Art" (Jul. 20, 2005), pp. 1-33 (also including cover page and Abstract).

J. Jager et al. "Adaptive Protection Co-ordination Methods Concerning a Dedicated Operation of Large IPP Units Connected to the Transmission Grid" 2006 International Conference on Power System Technology (IEEE 2006), pp. 1-5.

A. G. Phadke "Measurements for Adaptive Protection and Control in a Competitive Market" Virginia Tech, Blacksburg, VA, IEEE (2000), pp. 1-7.

* cited by examiner

DYNAMIC CONFIGURATION OF DISTRIBUTION FEEDER PARAMETERS IN A POWER GRID

TECHNICAL FIELD

The present disclosure relates generally to power grids, and, more particularly, to configuration of distribution feeder parameters (e.g., protection parameters) in power grids.

BACKGROUND

Electric power is generally transmitted from generation plants to end consumers (industries, corporations, homeowners, etc.) via a transmission and distribution grid consisting of a network of power stations, transmission circuits, and sub-stations interconnected by power-lines. Once at the end consumers, electricity can be used to power any number of devices.

With the advent of Smart Grid technologies, there is more focus on enabling protection and control in the distribution feeders and extending communications down to feeder devices. Electric utilities use medium voltage feeder lines to distribute energy to neighborhood transformers. Often, the physical electrical network may look like a graph with an open loop wherein the two ends of the loop are feeders connected to primary substations. Utilities designate places in the electrical network where the loop should be open while ensuring that electricity is supplied to all of their customers. In order to reduce the impact of a fault, typically utilities add automation devices such as reclosers, sectionalizers, and/or switches on the feeders. This helps contain the impact of the fault to a given segment of the feeder.

When the grid detects a fault (high current rush) on a feeder/line from a substation it acts promptly to protect itself by opening switches on the faulty line in order to cut off the high current. As a result, all customers on that feeder lose power until the fault location is identified, the faulty segment is isolated, and power is restored to customers whose electricity can be provided through routes which do not include the faulty segment.

In order for a distribution automation (DA) device (such as a circuit breaker/recloser controller) to function properly, the correct relay operating curve needs to be configured. This curve helps configure the sensitivity of the relay towards fault current (i.e., the time for which a fault current should be seen before the relay triggers and isolates the circuit). Relay operating characteristics (e.g., over current curves) today are manually configured to provide correct relay coordination, the goal being correct discrimination, i.e., each one must select and isolate only the faulty section of the power system network, leaving the rest of the system undisturbed. An important note about the relay operating characteristic and other relay configuration parameters, however, is that they are dependent on the circuit configuration, and in the case of reconfiguration (e.g., due to a fault or manual changes) need to be reconfigured depending on the new feeder configuration. The more complex the topology of a feeder circuit is, therefore, the more complex a task it is to manually configure these parameters.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computer-implemented system identifies a grid topology of a plurality of distribution automation (DA) devices of a distribution feeder circuit in a power grid, and determines parameters for each of the DA devices of the distribution feeder circuit based on the grid topology, e.g., protection parameters such that DA devices further from a power source in the power grid up to a normally open point (NOP) are configured to trigger protection later than DA devices closer to the power source. The plurality of DA devices may then be configured with respective parameters as determined, and in response to detecting a change of the grid topology, updated parameters may be determined for one or more of the DA devices of the distribution feeder circuit based on the changed grid topology. The system may then reconfigure respective parameters of each of the DA devices that have updated parameters due to the change of the grid topology, accordingly.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor/actuator networks, such as for "Smart Grid" and "Smart Cities," may cooperatively monitor and/or control physical or environmental conditions at different locations. For example, sensor networks may be used to monitor energy/power consumption, resource consumption, etc., while another type of smart object, actuators, may be responsible for turning on/off engine, opening/closing circuits, or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a communication network, such as a wireless network, though wired connections are also available. For instance, each smart device (node) in a smart object network may generally be equipped with a radio transceiver or other communication port, a microcontroller, and an energy source, such as a battery or a distribution grid power source. Typically, size and cost constraints on sensor nodes result in corresponding constraints on resources such as energy, memory, computational power and bandwidth.

Figure 1:
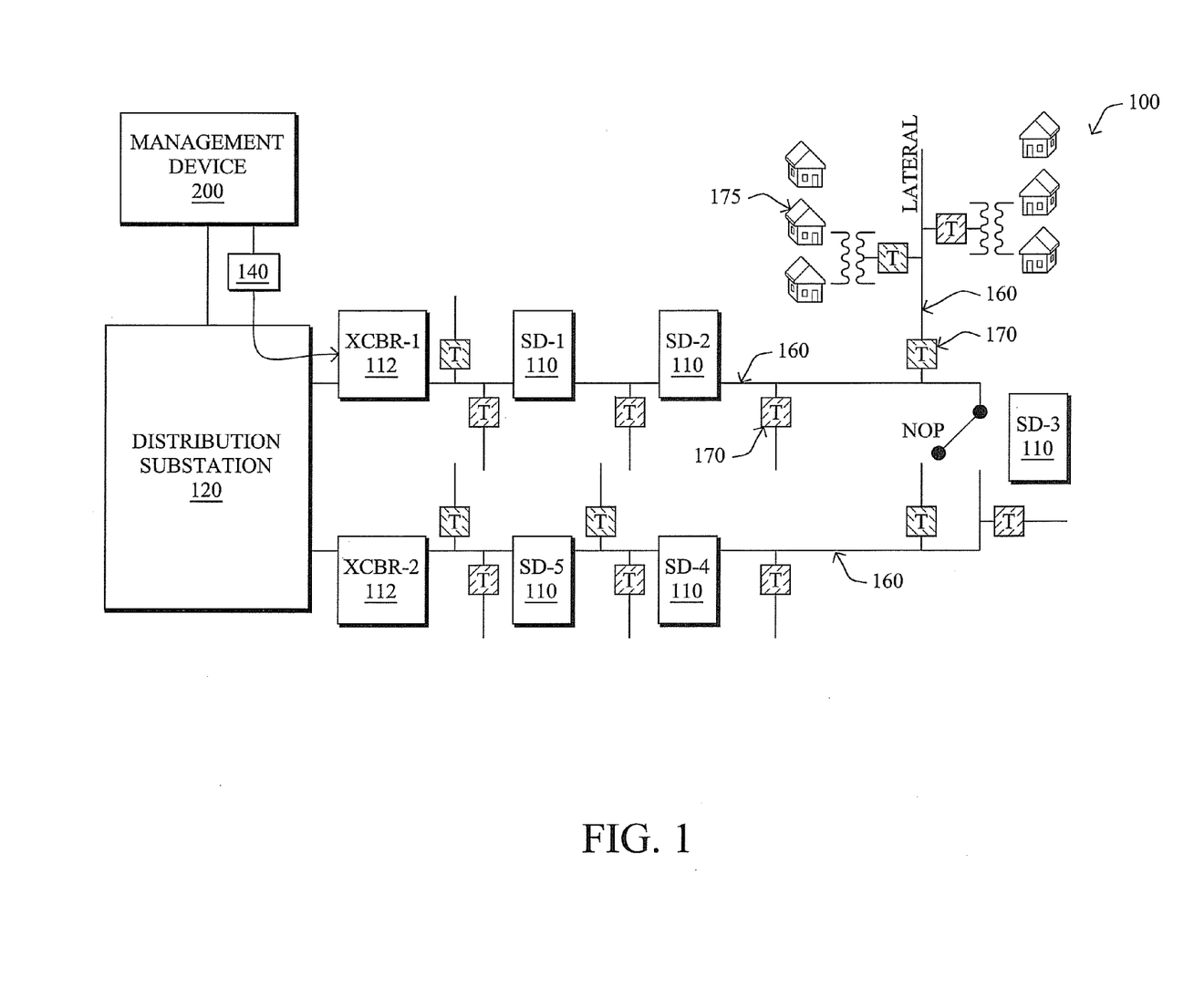
FIG. 1 illustrates an example distribution (looped) feeder circuit in a power grid.

FIG. 1 illustrates an example distribution (looped) feeder circuit 100 in a power grid. Those skilled in the art will appreciate that the circuit 100 is very simplified, and that much more complex topologies may be present in real-world configurations. For example, power-lines 160 may bring electrical grid power from a distribution substation 120, e.g., via a circuit breaker (XCBR) 112 at each end of a loop, to one or more transformers 170. Within the distribution-level powerlines 160, one or more distribution automation (DA) devices 110 (a.k.a., switching devices or SDs) as shown, such as, for example, sectionalizers, reclosers, etc., may be present in order to provide for fault protection as understood in the art and as further described herein. As shown, a grid topology includes configuring DA device SD-3 as a normally open point (NOP), to disconnect the loop, accordingly. Also, the power-lines 160 bring electrical grid power from respective transformers 170 into homes/businesses/etc. 175, generally via what's called a "lateral."

In addition, a management device/system 200, such as a supervisory control and data acquisition (SCADA) device or a substation computer, may be located in communication with intelligent end devices (IEDs) of the distribution feeder circuit 100, and may communicate data packets 140 (e.g., traffic and/or messages) with other communicating nodes/ devices 110 of the circuit/network 100. For instance, the links between the devices may be wired links (e.g., for power-line communication, e.g., PLC), optical fiber network, or may comprise a wireless communication medium.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Figure 2:
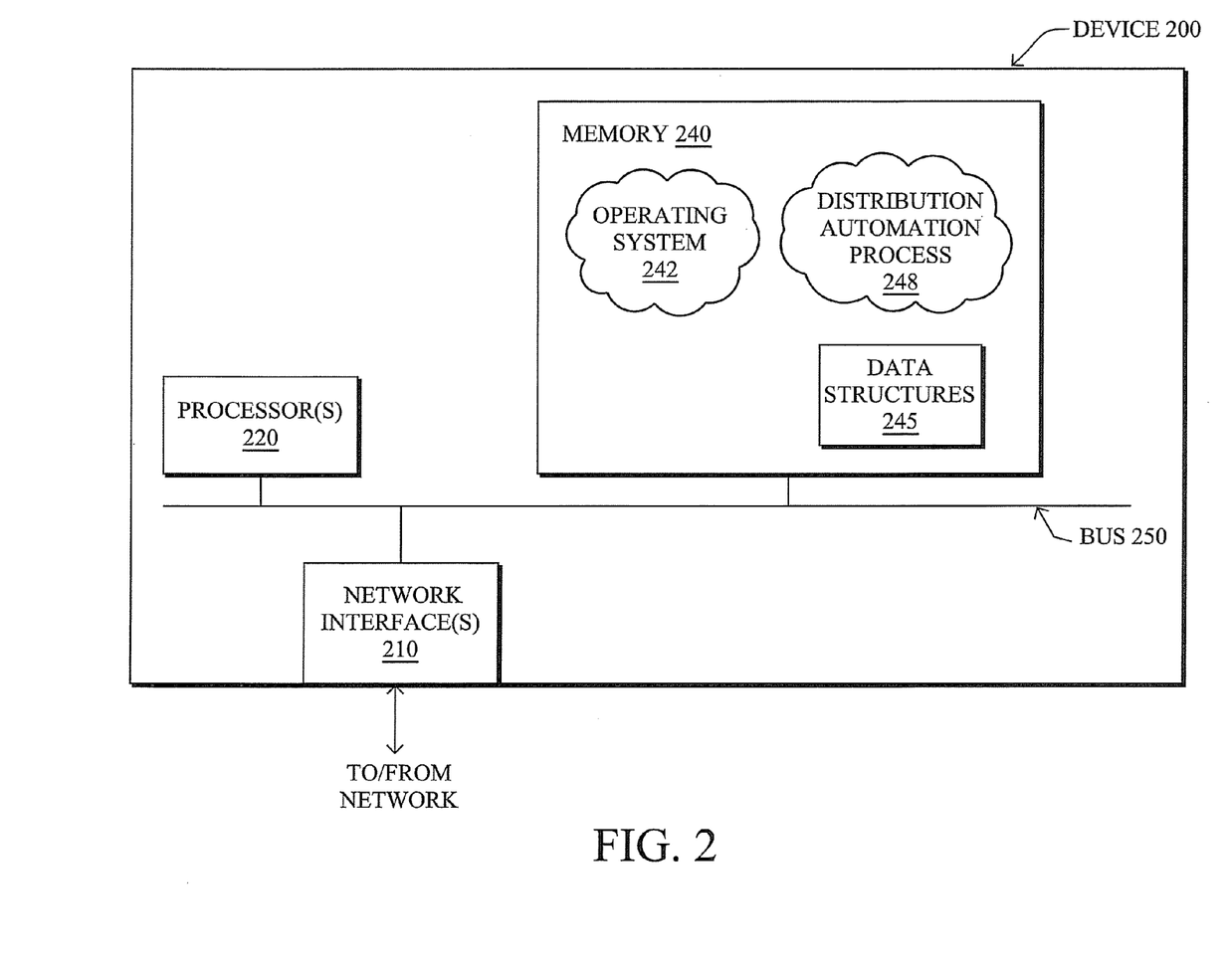
FIG. 2 illustrates an example management device/node.

FIG. 2 is a schematic block diagram of an example device 200 that may be used with one or more embodiments described herein, e.g., as a management device/system of FIG. 1 (e.g., a head-end device or application within a central management location). For example, the device 200 may be a computerized device configured as a utility company's controller of DA devices within the feeder circuit 100. The device 200 may comprise, as a simple representation, a network interface 210, a processor 220, and a memory 240 interconnected by a system bus 250.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), fiber optic lines, etc. In particular, the network interface is adapted to communicate with a plurality of DA devices of the distribution feeder circuit 100 in the power grid, for use particularly as described herein.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "distribution automation" process 248, for use as described herein, as well as other processes not shown for clarity.

As noted above, electric power is generally transmitted from generation plants to end consumers (industries, commercial, residential, etc.) via a transmission grid consisting of a network of power stations, transmission circuits, and substations interconnected by power lines. From the transmission grid, power may then be distributed to end consumers via a distribution system. Once at the end consumers, electricity can be used to power any number of devices, such as endpoint devices 175.

As also noted above, utilities designate places in the electrical network where the loop should be open (NOPs) while ensuring that electricity is supplied to all of their customers. In order to reduce the impact of a fault, typically utilities add automation devices such as reclosers, sectionalizers, and/or switches on the feeders (DA devices 110). This helps contain the impact of the fault to a given segment of the feeder.

Utilities are typically measured on the basis of the following metrics:
1. System average interruption duration index (SAIDI): average duration of all interruptions per utility customer during the period of analysis (usually annually). For each stage of each interruption, the product of the number of customers interrupted and the corresponding duration is calculated and is known as customer-minutes lost.
2. System average interruption frequency index (SAIFI): average number of interruptions (sustained) per utility customer during the period of analysis.
3. Momentary average interruption index (MAIFI): average number of momentary interruptions per utility per number of customers in the system. Typically, momentary interruptions are below a specified duration and are calculated separately. In regulated environments, the duration threshold is set by the regulator and is a key measure for counting duration-based interruptions, resulting in the application of penalties.

4. Customer total interruption duration index (CAIDI): average total duration of interruptions (sustained) among customers experiencing at least one outage in the period.

Those skilled in the art understand the benefits of adding automated devices to distribution feeders. In particular, by strategically placing, and more importantly controlling, various DA devices 110 such as circuit breakers, switchfuses, reclosers, switches, disconnectors, autosectionalizers, and switch disconnectors, fault current conditions may be handled in order to minimize the metrics for SAIDI, SAIFI, MAIFI, and/or CAIDI.

Figure 3:
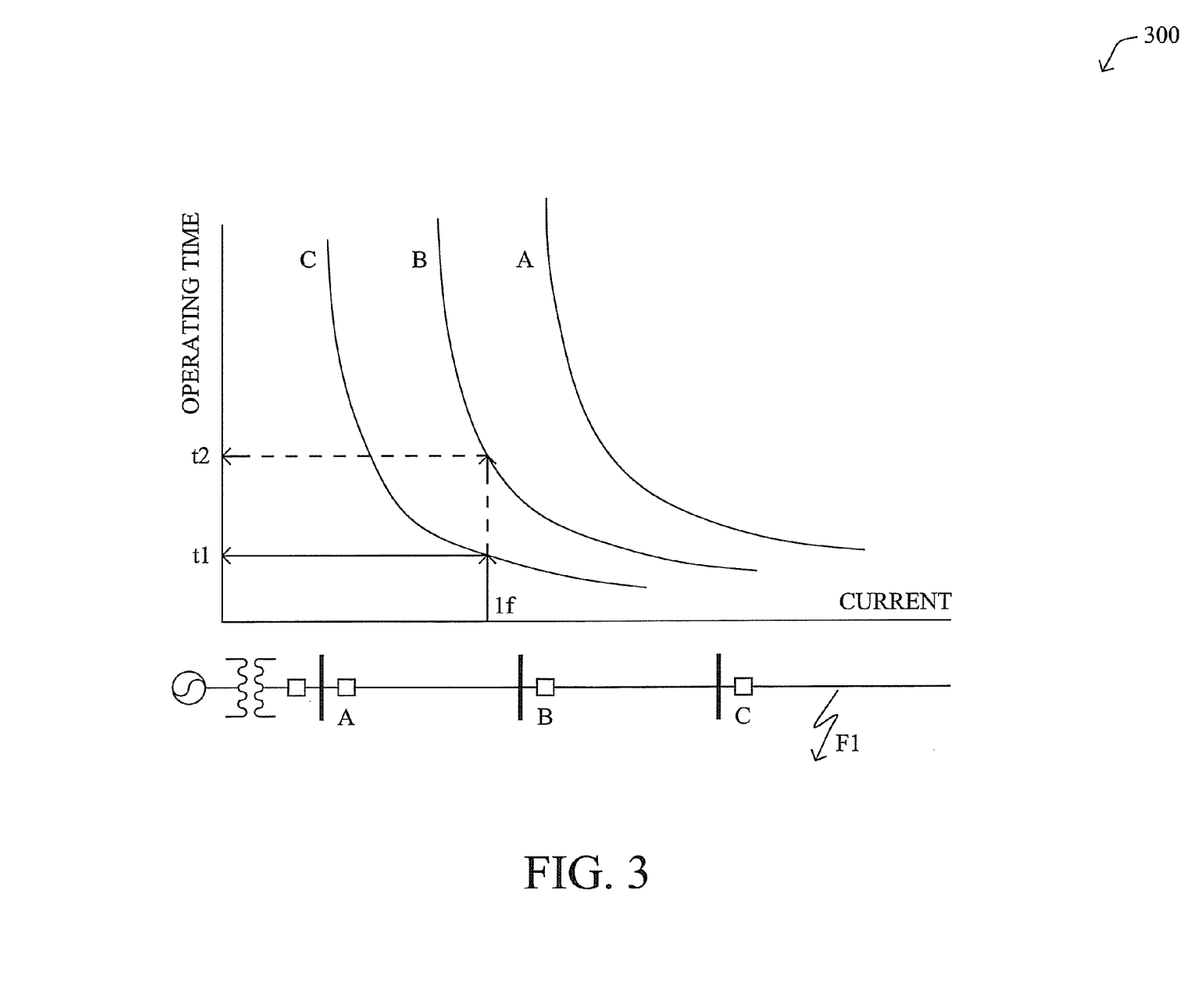
FIG. 3 illustrates an example of fault current curves (over-current curves)

In order for a DA device 110, such as a circuit breaker/recloser, controller to function properly, the correct relay operating curve needs to be configured. This curve helps configure the sensitivity of the relay towards fault current (i.e., the time for which a fault current should be seen before the relay triggers and isolates the circuit). FIG. 3, for example, illustrates an example of fault current curves (over-current curves) 300 with the three (3) fault current curves for example devices A, B, C, in order of distance from a source of the power, e.g., substation 120.

For instance, as an example for an over-current protection relay, relay operating characteristics such as an over-current curve 300 can be designed to provide correct relay coordination, where the goal is to give correct discrimination, i.e., each DA device must select and isolate only the faulty section of the power system network, leaving the rest of the system undisturbed. For example, this relay operating curve also helps with the following faults: transient faults, such as a tree touching a power line, which will clear without external intervention (e.g., by burning the tree branch); or permanent faults, which require external intervention (e.g., remote intervention or an onsite crew, a.k.a., a "truck roll").

When the grid detects a fault (e.g., high current rush) on a feeder/line from a substation it acts promptly to protect itself by opening switches on the faulty line in order to cut off the high current. As a result all customers on that feeder lose power until the fault location is identified, the faulty segment is isolated, and power is restored to customers whose electricity can be provided through routes which do not include the faulty segment. In particular, with reference to FIG. 3, if there is a fault at location "F1," the fault current ("$I_f$") should trigger a switch at the closer device to the fault (device C at time t1) before triggering a switch at a device further from the fault (device B at later time t2). In this manner, once device C switches to an open state, isolating the fault from the rest of the circuit's segment, device B no longer needs to perform the switch itself, as the fault current $I_f$ will be have been alleviated.

An important note about the relay operating characteristic and other relay configuration parameters is that they are dependent on the circuit configuration. Therefore, in case of circuit reconfiguration, the parameters of the various intelligent devices may need to be reconfigured depending on the new feeder configuration (topology). Also, in the event renewal generation on the distribution feeders crosses 25%-30% threshold (e.g., energy from renewable resources, such as solar, wind, etc.), these parameters may need to be reconfigured dynamically based on the amount of power being sent from the distributed generation site (e.g., from the solar cells, wind farms, etc.) versus the traditional route of power from the substation 120.

Notably, the curves 300 described above in FIG. 3 are an example of a static configuration for DA device parameters which are optimized for a specific grid topology. As noted above, once a fault is detected isolated the grid automatically attempts to restore power to grid segments which were cut-off from power. As part of the restoration process, some switches are opened and others are closed, thus altering the initial grid topology. Consequently, the original parameters (curves 300) which were suitable for the previous grid topology may no longer be optimal for the new grid topology.

Conventionally, utilities may attempt manual configuration to modify the parameters after a restoration process completes, however this manual process may be challenging and time consuming when complex grid topologies (such as topologies involving multiple renewable/distributed generators) are involved.

Dynamic Protection Parameters

The techniques herein dynamically reconfigure feeder DA device configuration parameters in an automated fashion, based on the current (i.e., up-to-date) electrical grid topology. That is, as part of the restoration phase of Fault Location, Isolation, and Restoration (FLIR), the grid topology changes and as such the original parameters which were optimized for the initial topology are no longer optimal for the new/modified topology. The techniques described herein extends the FLIR process with yet another step of optimal reconfiguration (e.g., a FLIR optimal Reconfiguration or "FLIRoR" process), which allows the utility to dynamically obtain the "as-is" topology information of the distribution feeder based on the status (open/closed) of the different devices and then configure different set-points/parameters on the devices, i.e., in order to configure the grid for optimized operation in case another fault takes place after the grid has been reconfigured. Such an algorithm improves power reliability and increases customer satisfaction.

Specifically, according to one or more embodiments of the disclosure as described in greater detail below, a computer-implemented system (e.g., management device 200) identifies a grid topology of a plurality of distribution automation (DA) devices 110 of a distribution feeder circuit 100 in a power grid, and determines parameters for each of the DA devices of the distribution feeder circuit based on the grid topology, e.g., protection parameters such that DA devices further from a power source in the power grid up to a normally open point (NOP) are configured to trigger protection earlier than DA devices closer to the power source. The plurality of DA devices may then be configured with respective parameters as determined, and in response to detecting a change of the grid topology, updated parameters may be determined for one or more of the DA devices of the distribution feeder circuit based on the changed grid topology. The system may then reconfigure respective parameters of each of the DA devices that have updated parameters due to the change of the grid topology, accordingly.

Illustratively, the techniques described herein may be performed by hardware, software, and/or firmware, such as in accordance with distribution automation process 248, which may contain computer executable instructions executed by the processor 220 to perform functions relating to the novel techniques described herein. For example, the application can work either in a SCADA center, in the substation, or even as a distributed control system (distributed computer devices within the feeder circuit 100) using various computation points in the grid. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Operationally, the system (process 248) identifies/calculates the up-to-date grid topology of DA devices 110/112 (generally, "110" herein) based on various sensor readings and grid state estimation. For example, the identification may utilize a sensor on each of the plurality of DA devices 110 to determine its location in the distribution feeder circuit in relation to other DA devices, or else may otherwise detect/determine an open/close state of each of the DA devices to determine one or more NOPs. In a still further embodiment, various probe messages (140) may be utilized on the distribution feeder circuit to determine a location in the distribution feeder circuit of each DA device in relation to other DA devices and to also determine one or more NOPs, e.g., by sending out a probe from the substation 120, and recording device identifications as the probes propagate to an NOP and are returned. These topology-identifying techniques are merely examples, and are not meant to limit the embodiments herein. Note also that the embodiments herein are applicable to a variety of distribution feeder configurations such as loop feeders (as shown), as well as radial feeders, multi-feeder networks, etc.

According to the illustrative topology of FIG. 1 above, it may be determined that a first segment of the feeder circuit 100 comprises, in order, XCBR-1, SD-1, and SD-2 to SD-3 (an NOP), while a second segment comprises XCBR-2, SD-5, and SD-4 to SD-3 (the NOP).

From the identified grid topology, the system herein identifies/calculates the optimal device configuration. In other words, the process 248 determines optimal parameters such as "protection parameters" (e.g., over-current curves) for each of the DA devices 110 of the distribution feeder circuit 100 based on the grid topology. In particular, the protection parameters are coordinated in such a way that the downstream protection (switching) devices trigger before the upstream switching device, i.e., such that DA devices further from a power source in the power grid up to an NOP are configured to trigger protection earlier than DA devices closer to the power source (e.g., substation 120).

Figure 4:
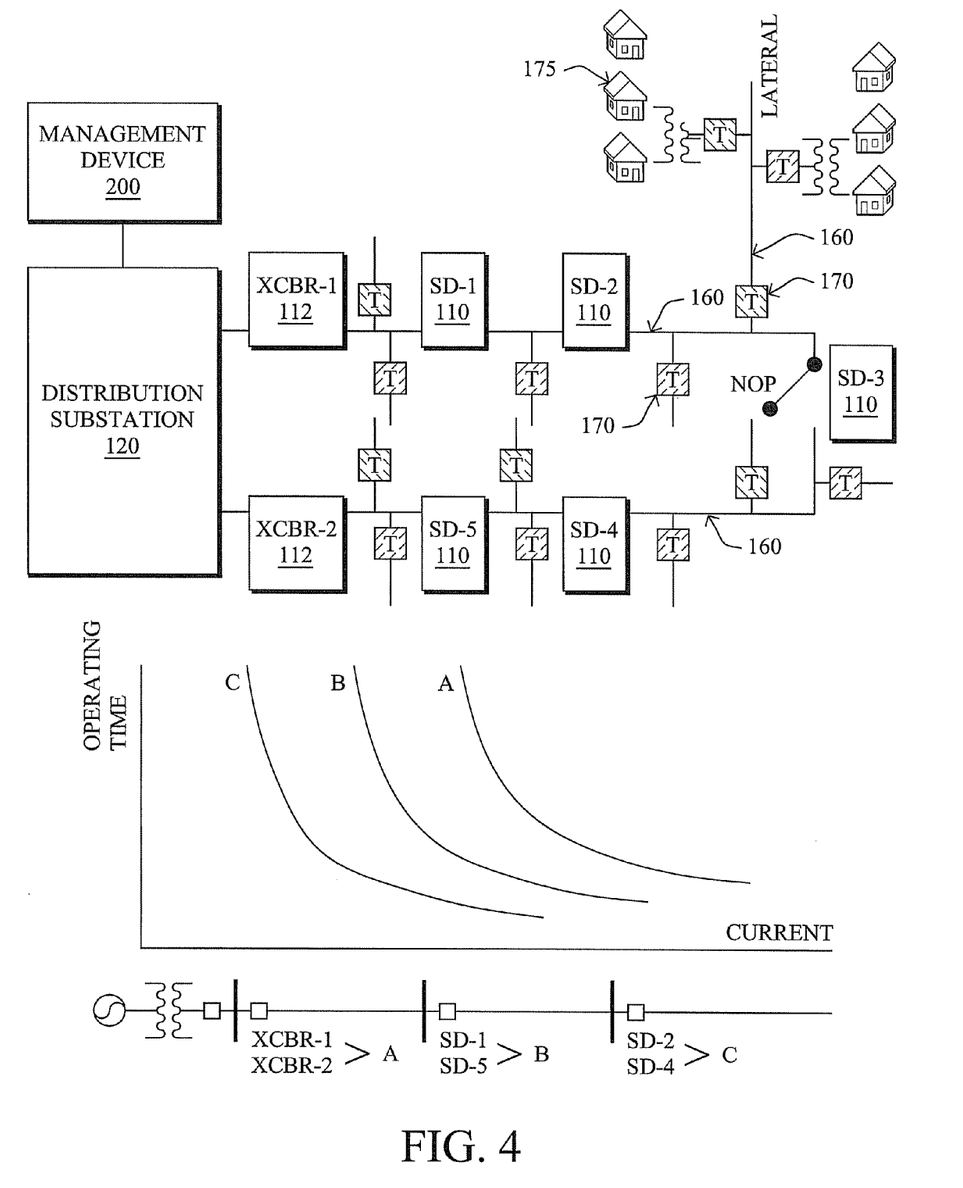
FIG. 4 illustrates the example distribution feeder circuit with proper current curves.

FIG. 4 illustrates the example distribution feeder circuit 100 with proper current curves for the DA devices 110. In particular, for each circuit segment, devices closer to the power source are configured to wait longer than further away devices prior to triggering protection (switching, opening, etc.). For instance, for each segment, devices SD-2 and SD-4, furthest from the source (substation 120) are first to trigger protection (curve C), followed next by SD-1 and SD-5 (curve B), and then XCBR-1 and XCBR-2 (curve A), respectively, depending upon a location of the fault current. Note also that while illustrative curves for A, B, and C are shown, the curves may differ, and the illustrative curves shown herein are merely representative of the necessary characteristic herein, i.e., that devices further from the power source trigger protection first.

Once the device parameters, such as the protection parameters are determined for each device, the distribution automation process 248 may configure the plurality of DA devices 110 with the respective parameters, such as through corresponding control messages 140 sent to the devices using various communication protocols as described above or otherwise understood in the art.

It is important to point out that response curves themselves are generally already a feature of protection devices, and methods exist for configuring which of one or more preloaded curves are to be used depending on the desired performance characteristics. However, according to the techniques herein, network-obtained knowledge of the state of the devices, e.g., open or closed, the physical location of the protection device relative to other protection devices, and particularly, as described herein, based on reconfiguration of the network may be used to assign or designate a different curve with the goal of obtaining more desirable operating characteristics for the configuration that may exist after a fault event.

Specifically, in accordance with one or more embodiments herein, the system (process 248) monitors the grid to detect changes of the grid topology, e.g., resulting from FLIR technology processing, renewable energy generation variation detection (e.g., generation greater than a certain threshold), or other topology changes such as detecting manual changes due to grid maintenance, etc. Referring to FIG. 5, assume that a fault occurs between devices SD-1 and SD-2 in the feeder circuit 100. According to the topology and protection parameters as shown in FIG. 4, SD-1 may trigger protection to isolate the fault, and then based on conventional restoration techniques (e.g., FUR), DA device SD-2 may also open, while SD-3, the NOP, closes in order to provide power to consumers located between SD-2 and SD-3, accordingly.

Figure 5A:
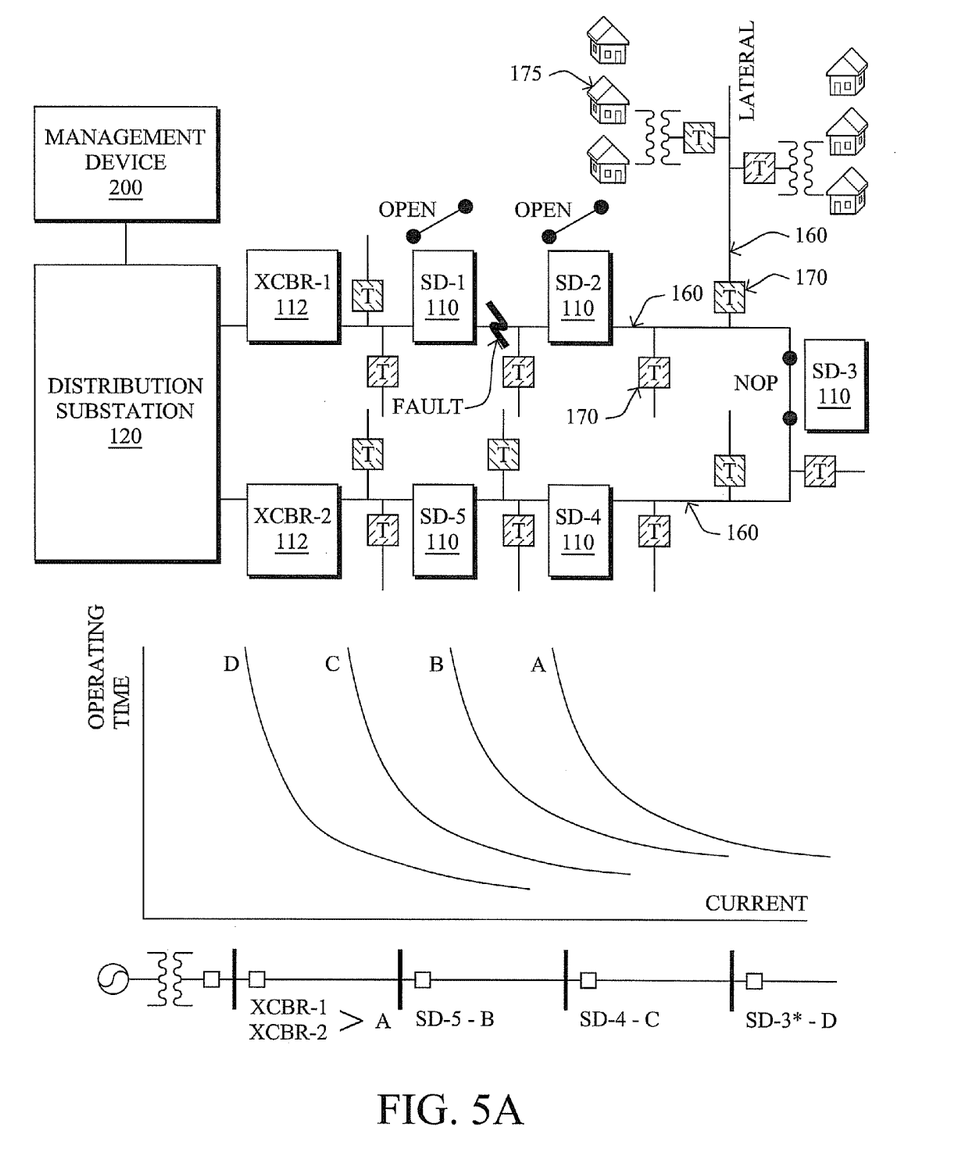
FIGS. 5A-5B illustrates the example distribution feeder circuit with a changed topology in response to a fault, and updated current curves.

When a fault occurs and the feeder is reconfigured in this manner, as shown in the feeder configuration in FIG. 5A, the various device parameters, such as the over-current curves, need to be updated. For instance, DA device. SD-2's parameters, without reconfiguration, remain as defined in FIG. 4, being the same as those of SD-4. However, now that SD-1 and SD-2 are open, and SD-3 is closed, the curves of the DA devices in the circuit are incorrectly (non-optimally) configured. According to the techniques herein, therefore, the system dynamically invokes the process 248 to determine the new distribution topology and to calculate optimal device parameters for the new topology, i.e., determining updated protection parameters for one or more of the DA devices of the distribution feeder circuit based on the changed grid topology. In particular, the system identifies DA devices 110 which need to be reconfigured based on the calculated parameters, and reconfigures the respective protection parameters of each of the DA devices identified with updated protection parameters due to the change of the grid topology.

Figure 5B:
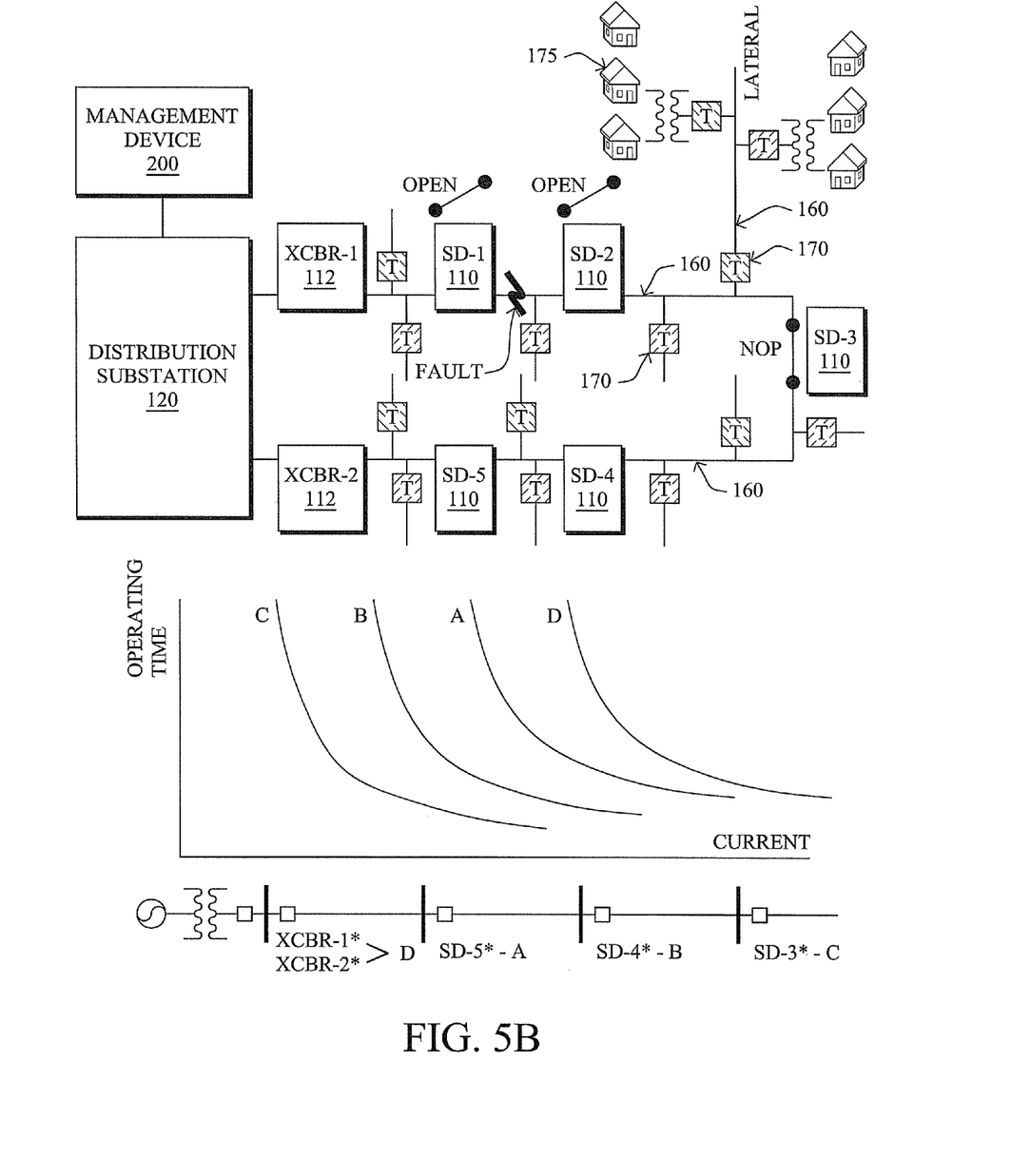

Illustratively, as shown in FIG. 5A, a system in accordance with one or more embodiments herein selects from a set of predefined curves from which the protection parameters are determined to update the configurations of devices as needed. As shown in FIG. 5A, SD-3 may need to be reconfigured with updated protection parameters (curves) as shown (with an asterisk *), e.g., adding a new curve "D" to the set of curves in the network. Alternatively, as shown in FIG. 5B, the new curve "D" may be located to the right of curve A on the graph, and as such, all of the devices need reconfiguration of their protection parameters. Note that the decision to configure all devices or some devices may be based on available curves, a number of devices to configure, an ease of reconfiguring all devices over only certain devices, etc.

In specific embodiments, the curves may be stored in the DA devices (e.g., breakers, switches, etc.) themselves, and the configuration regarding which curves should be utilized in each specific device is selected by the management system 200. Alternatively, the curves themselves may be transmitted (downloaded) to the devices from the system 200 as needed. Alternatively, still, these curves may be defined (programmed) dynamically by the distribution automation process 248, and then transmitted to the DA devices 110 from the system 200.

Figure 5C:
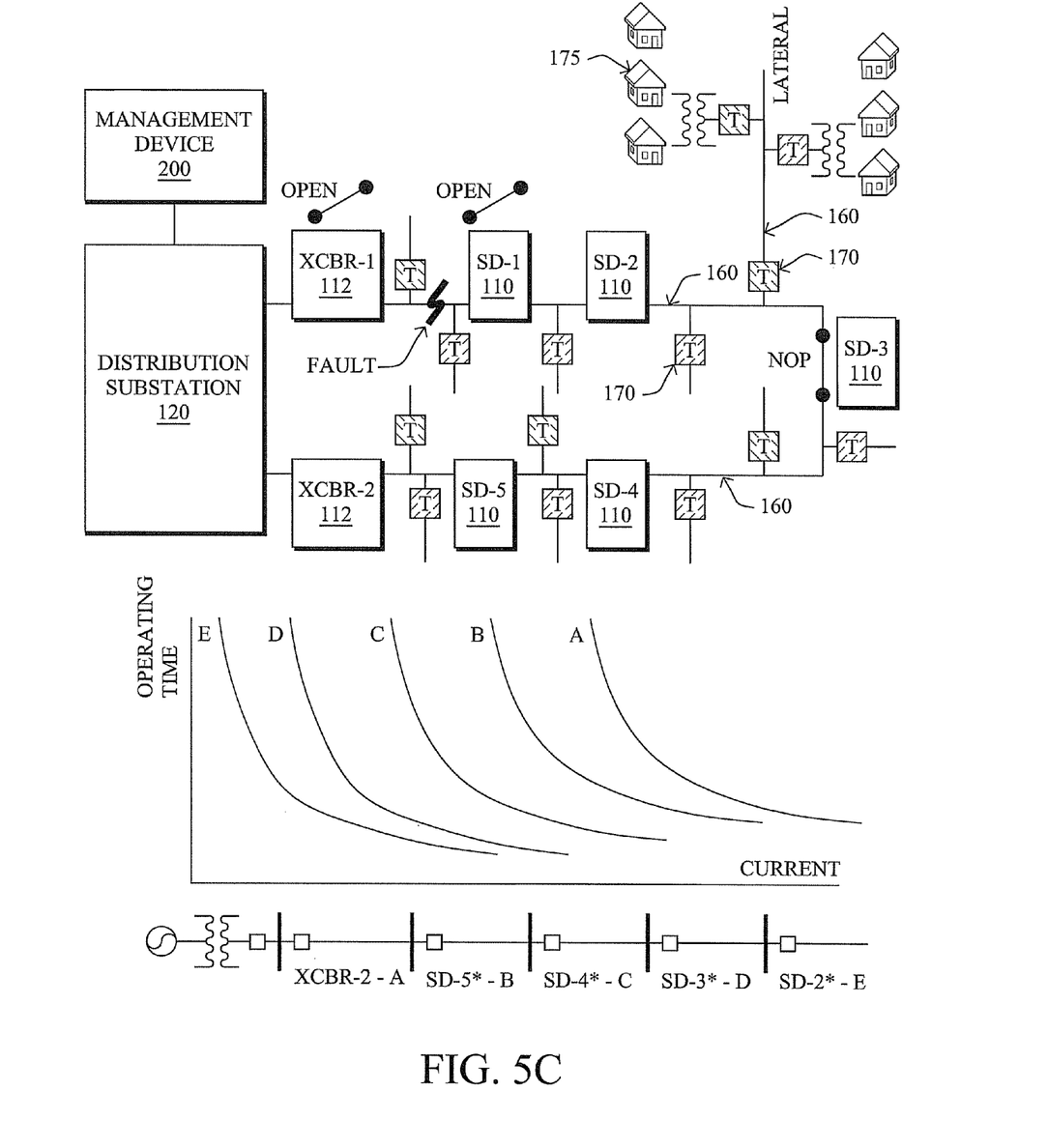
FIG. 5C illustrates the example distribution feeder circuit with an alternative changed topology in response to a fault, and updated current curves.

As an alternative example, FIG. 5C illustrates when the fault occurs on the grid segment to the left of SD-1 (with respect to the topology in FIG. 4). As part of this restoration, XCBR-1 remains open (after opening in response to the fault), SD-1 opens and SD-3 closes. In this specific case, the over-current curve of SD-2 and SD-3 (or, alternatively as discussed for FIG. 5B, all of the remaining DA devices) may need to be reconfigured.

Based on the reconfiguration of parameters such as the protection parameters in response to changes in grid topology, grid operation remains optimal for future faults. Note that if a fault will only last for a short length of time (e.g., relatively transient), when/if the grid returns to the previous configuration, the new topology may again be accounted for based on the techniques above.

Figure 6:
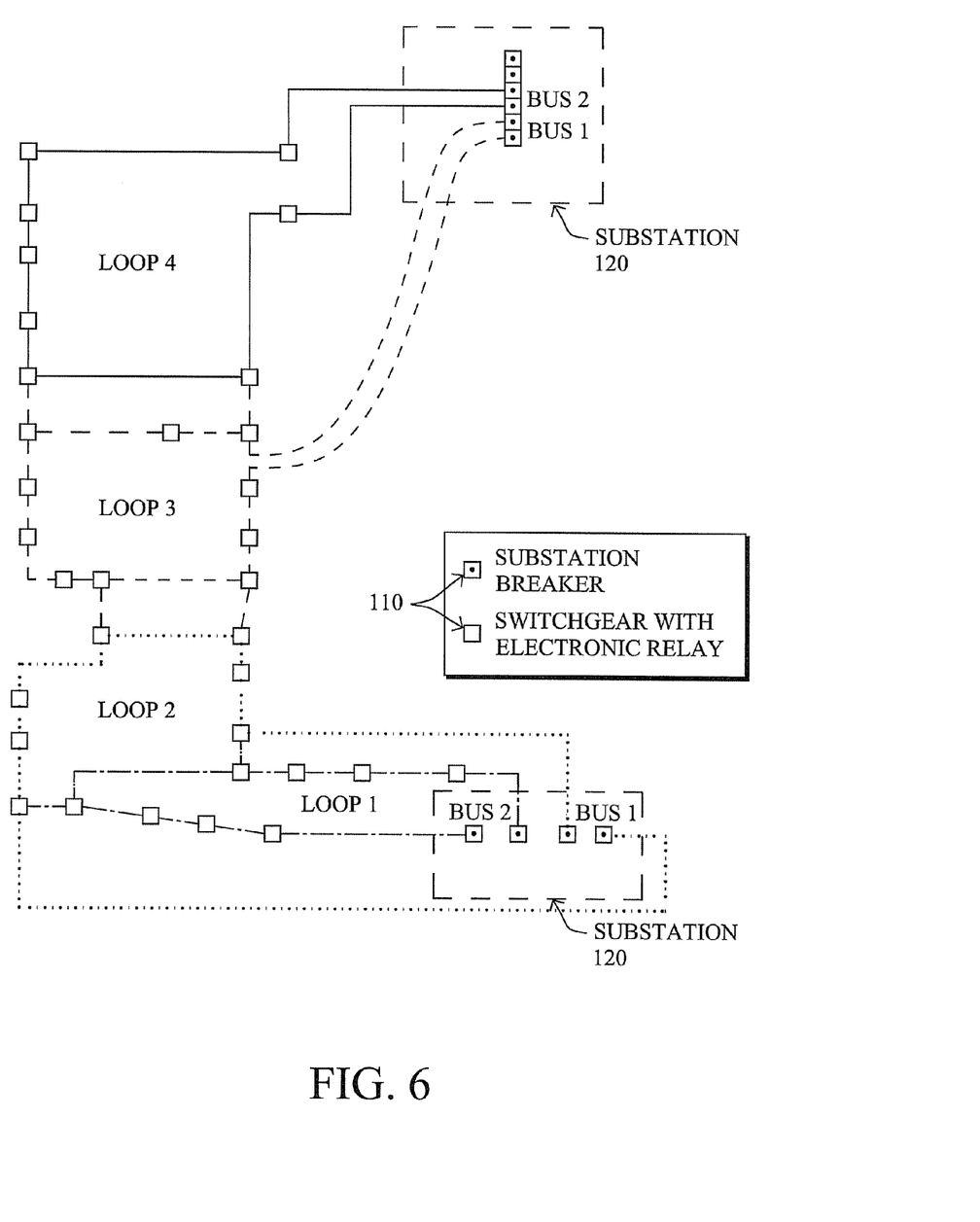
FIG. 6 illustrates an example multi-feeder and multi-loop distribution circuit in a power grid.

Note that while simple parameters such as the protection parameter reconfiguration can be handled manually for a simple topology (such as the one described in FIG. 4), the manual configuration solution may be too cumbersome, time consuming, and not practical for more complicated topologies such as the topology of distribution network with multi-feeder/multi-loop which is illustrated in FIG. 6. For instance, in FIG. 6, a fault in loop-1 may trigger a reconfiguration in loop-2, loop-3 and loop-4 in a recursive fashion. Once the restoration process is complete, the techniques herein identify the new topology and configure the parameters of the various devices as needed.

Figure 7A:
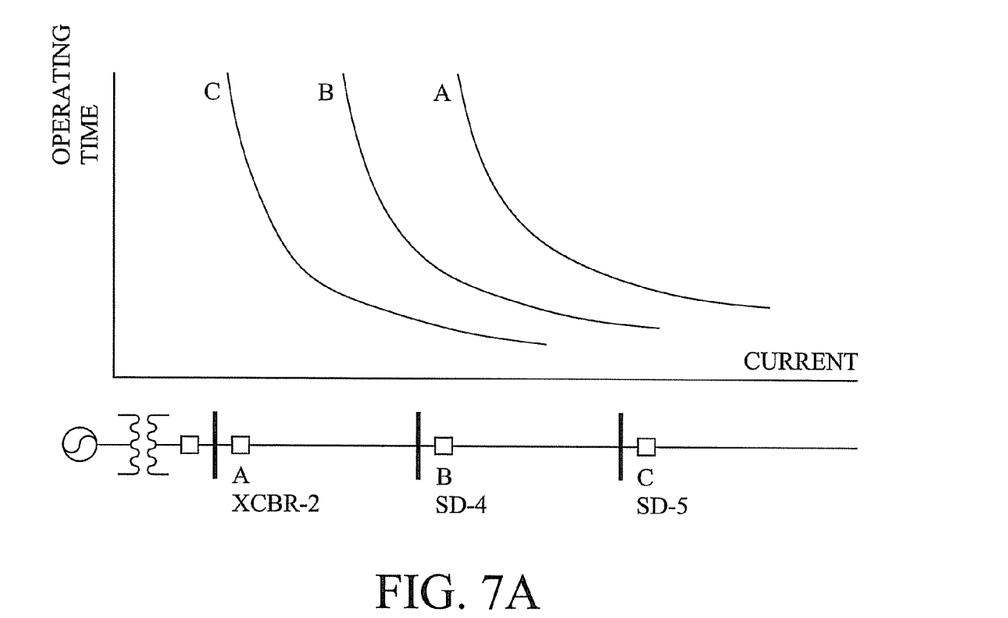
FIGS. 7A-7B illustrate an example of manual configuration and dynamic recommended reconfiguration.
Figure 7B:
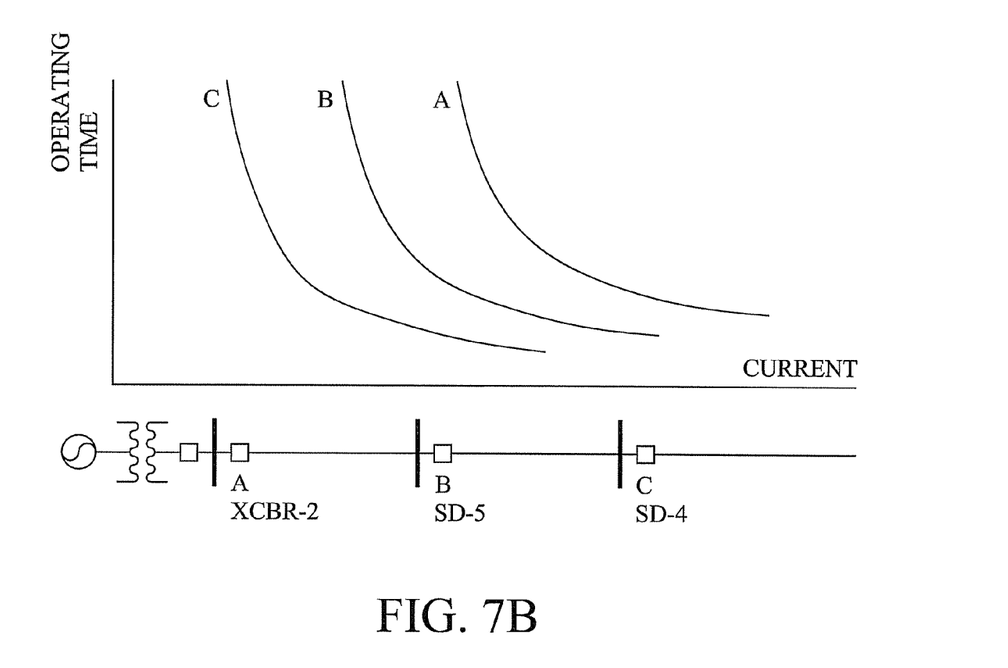

In accordance with another aspect of the techniques herein, if a grid operator attempts to manually configure parameters on a DA device, such as an over-current curve, the system may run a sanity check to verify that the new proposed parameters are optimal for the up-to-date grid topology. In case the system the parameters are not optimal (i.e., determining that the manual configuration of the protection parameters does not configure DA devices further from a power source in the power grid to trigger protection earlier than DA devices closer to the power source), the system may raise an alarm and provide a recommended optimal configuration (revised protection parameters). For instance, assuming that the manual configuration of parameters as shown in FIG. 7A is created by a user, the system may analyze this configuration before committing them into the device. As illustrated in FIG. 7A, and with reference to the pre-fault topology described in FIG. 1, in case the user attempts to configure non-optimal device parameters (e.g., where device SD-4 triggers protection before SD-5), the system alerts the user and suggests an optimal configuration, e.g., as shown in FIG. 7B (e.g., where device SD-4 and SD-5 are swapped, as in the curve of FIG. 4).

Figure 8:
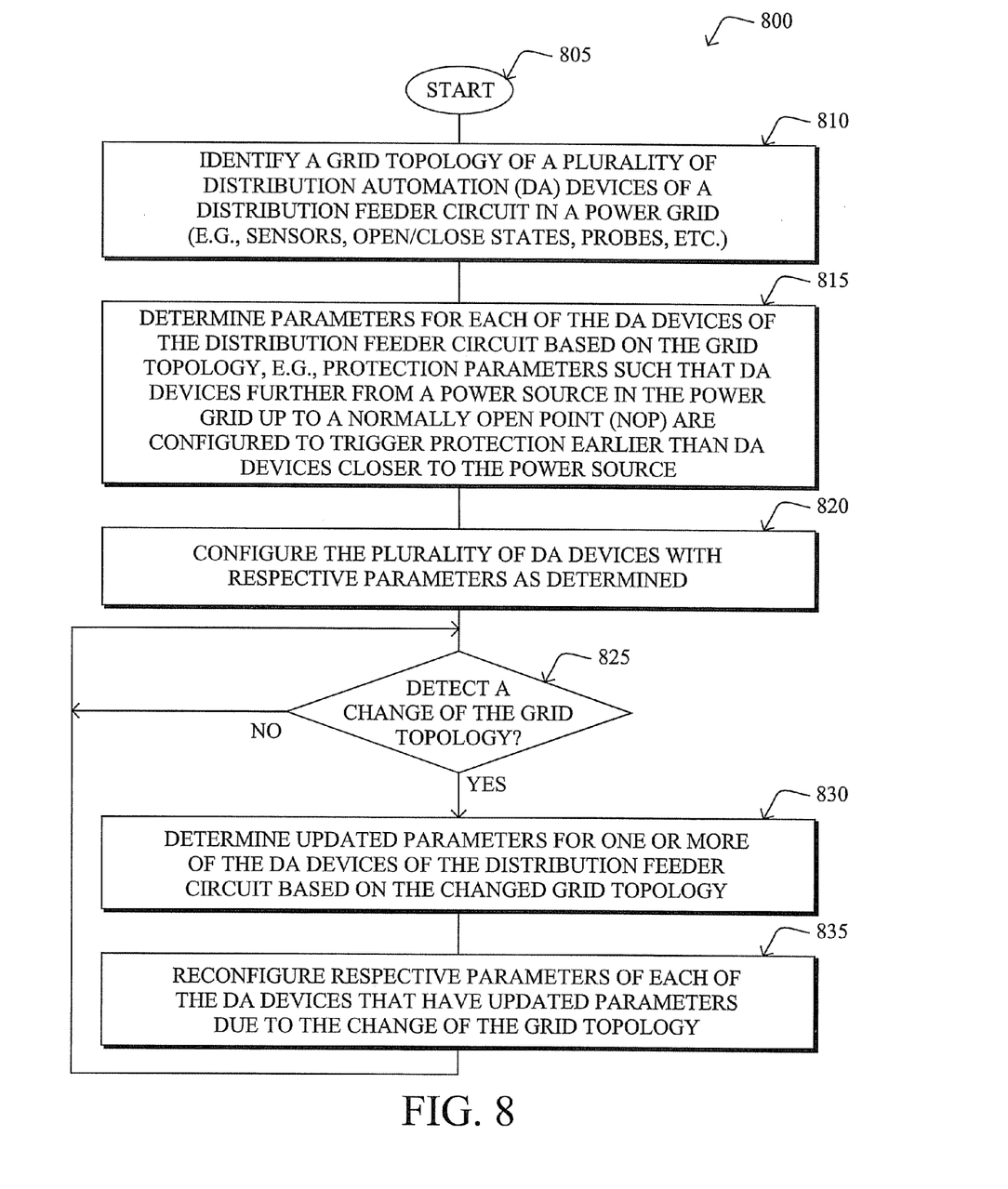
FIG. 8 illustrates an example simplified procedure for adaptively controlling device parameters in a distribution feeder circuit.

FIG. 8 illustrates an example simplified procedure for adaptively controlling protection parameters in a distribution feeder circuit in accordance with one or more embodiments described herein. The procedure 800 starts at step 805, and continues to step 810, where, as described in greater detail above, a management (computer) system 200 identifies a grid topology of a plurality of distribution automation (DA) devices 110 of a distribution feeder circuit 100 in a power grid. For example, as described above, the identification may be based on, e.g., sensors, open/close states, probes, etc. In step 815, the management device may determine parameters such as the protection parameters (e.g., over-current curves 300) for each of the DA devices of the distribution feeder circuit based on the grid topology such that DA devices further from a power source (e.g., substation 120) in the power grid up to an NOP are configured to trigger protection earlier than DA devices closer to the power source. Based thereon, the management device configures the plurality of DA devices with respective protection parameters in step 820 as determined.

Once the initial configuration is established, the system monitors the state of the topology (e.g., for FLIR events, renewable energy generation variation, manual grid maintenance, etc., as mentioned above), and may detect a change of the grid topology in step 825. Accordingly, in step 830, the system determines updated parameters such as the protection parameters for one or more of the DA devices of the distribution feeder circuit based on the changed grid topology, and reconfigures the respective parameters such as the protection parameters of each of the DA devices that have updated protection parameters due to the change of the grid topology in step 835. The process 800 continues to adaptively optimize the protection parameters based on any detected changes to the topology in step 825, without the need for cumbersome manual intervention, as described herein.

Figure 9:
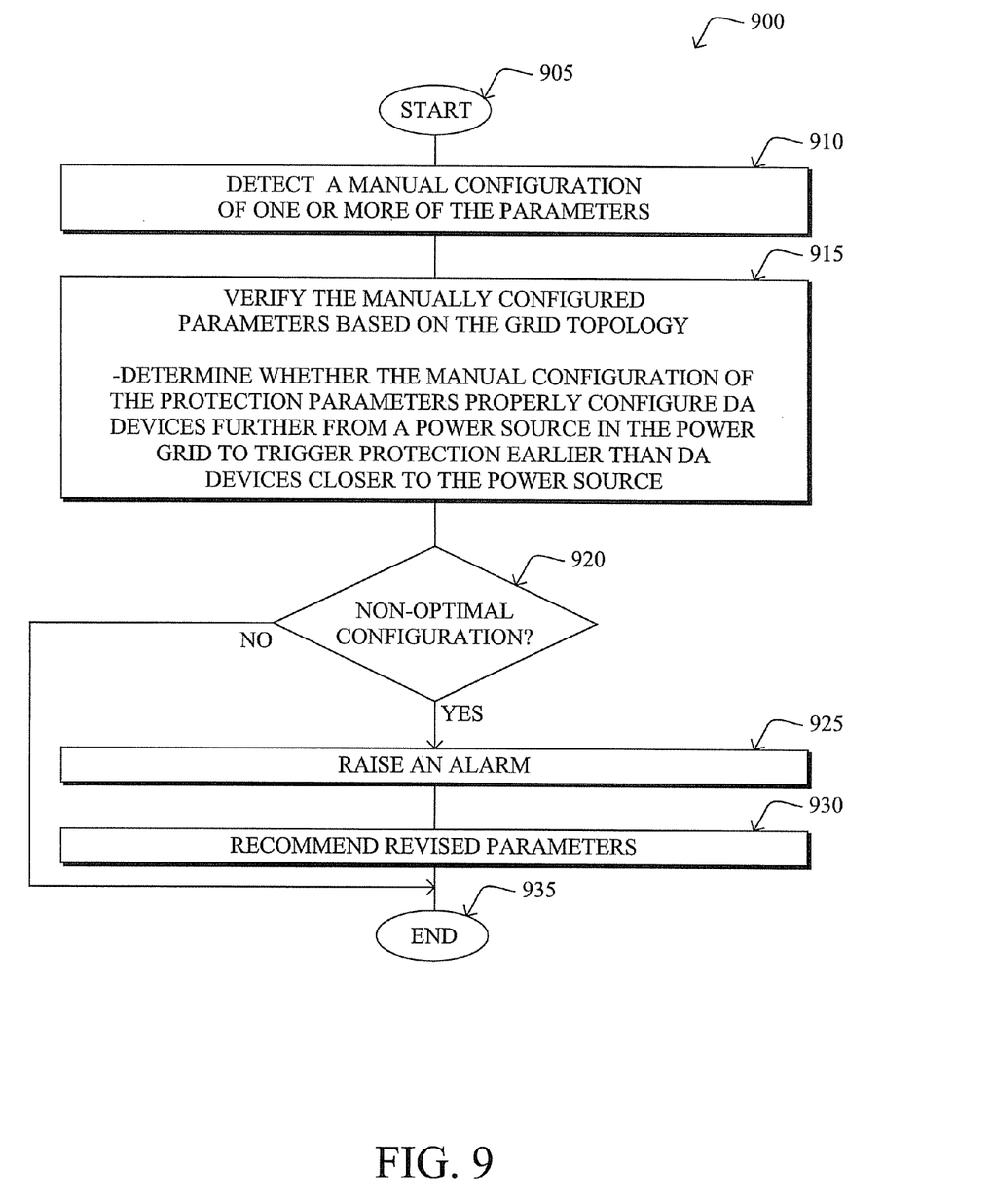
FIG. 9 illustrates another example simplified procedure for adaptively controlling device, parameters in a distribution feeder circuit.

In addition, FIG. 9 illustrates another example simplified procedure for adaptively controlling parameters such as the protection parameters in a distribution feeder circuit in accordance with one or more embodiments described herein. The procedure 900 starts at step 905, and continues to step 910, where, as described in greater detail above, the system (management device 200) detects a manual configuration of one or more of the protection parameters. In step 915, the manually configured protection parameters may be verified based on the grid topology as detailed above, e.g., by determining whether the manual configuration of the protection parameters properly configure DA devices 110 further from a power source (e.g., substation 120) in the power grid to trigger protection earlier than DA devices closer to the power source. If there is a non-optimal configuration determined in step 920, then in step 925 the system may optionally raise an alarm, and may also recommend revised protection parameters in step 930, as described above. Alternatively (not shown in procedure 900), the system may automatically download new optimal parameters to specific devices so as to improve overall system performance. The procedure 900 illustratively ends in step 935, for example, until another manual configuration is detected.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The novel techniques described herein, therefore, provide for adaptive control of protection parameters in a distribution feeder circuit of a power grid. In particular, the novel techniques provide for optimal grid operation (power protection) through grid topology changes, and may improve reliability considerably. That is, the techniques above provide functionality that would be difficult, if not practically impossible, to perform manually, such as the time-dependent identification of the grid topology of the circuit, as well as the adaptive (e.g., and optimal) reconfiguration of protection parameters based on the changing topology, which are each critical for large scale deployments. Note also that in places where power reliability affects the electrical rate this improved algorithm would translate to improving the utilities' bottom line. The algorithm herein is further an operational expense saver for the utility, as typical utilities may have over 50,000 end points with 100,000 miles of distribution feeders.

While there have been shown and described illustrative embodiments that provide for adaptive control of protection parameters in a distribution feeder circuit of a power grid, it is to be understood that various other adaptations and modifications may be made within the spirit and scope of the embodiments herein. For example, the embodiments have been shown and described herein with relation to particular techniques for determining topologies and topology changes. However, the embodiments in their broader sense are not as limited, and may, in fact, be used with other techniques to determine topologies and topology changes that may be understood by those skilled in the art. Also, while the embodiments above generally describe protection parameters as over-current curves, other protection parameters may be configured, and the use of over-current curves is not meant to limit the embodiments herein. In addition, while the techniques above make reference to distribution systems in particular, the disclosure herein may be applicable to both the transmission and distribution portions of the electric power grid.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computer-implemented method, comprising:
identifying a grid topology of a plurality of distribution automation (DA) devices of a distribution feeder circuit in a power grid;
determining parameters for each of the DA devices of the distribution feeder circuit based on the grid topology;
configuring the plurality of DA devices with respective parameters as determined;
detecting a change of the grid topology; and
in response to the change of the grid topology:
i) determining updated parameters for one or more of the DA devices of the distribution feeder circuit based on the changed grid topology; and
ii) reconfiguring respective parameters of each of the DA devices that have updated parameters due to the change of the grid topology.

2. The method as in claim 1, wherein the parameters comprise protection parameters determined based on the grid topology such that DA devices further from a power source in the power grid up to a normally open point (NOP) are configured to trigger protection earlier than DA devices closer to the power source.

3. The method as in claim 2, wherein the protection parameters comprise over-current curves selected from a group consisting of: predefined curves from which the protection parameters are determined; and dynamically determined curves that are downloaded to the DA devices.

4. The method as in claim 1, wherein identifying the grid topology comprises:
utilizing a sensor on each of the plurality of DA devices to determine its location in the distribution feeder circuit in relation to other DA devices.

5. The method as in claim 1, wherein identifying the grid topology comprises:
determining an open/close state of each of the DA devices to determine one or more normally open points (NOPs).

6. The method as in claim 1, wherein identifying the grid topology comprises:
utilizing one or more probe messages on the distribution feeder circuit to determine a location in the distribution feeder circuit of each DA device in relation to other DA devices and to also determine one or more normally open points (NOPs).

7. The method as in claim 1, wherein detecting the change comprises:
detecting the change using a technique selected from a group consisting of: fault location, isolation, and restoration (FLIR) technology; renewable energy generation variation detection; and manual grid maintenance detection.

8. The method as in claim 1, further comprising:
detecting a manual configuration of one or more of the parameters; and
verifying the manually configured parameters based on the grid topology.

9. The method as in claim 8, wherein the parameters comprise protection parameters determined based on the grid topology such that DA devices further from a power source in the power grid up to a normally open point (NOP) are configured to trigger protection earlier than DA devices closer to the power source, the method further comprising:
determining that the manual configuration of the protection parameters does not configure DA devices further from a power source in the power grid to trigger protection earlier than DA devices closer to the power source; and
raising an alarm.

10. The method as in claim 8, wherein the parameters comprise protection parameters determined based on the grid topology such that DA devices further from a power source in the power grid up to a normally open point (NOP) are configured to trigger protection earlier than DA devices closer to the power source, the method further comprising:
determining that the manual configuration of the protection parameters does not configure DA devices further from a power source in the power grid to trigger protection earlier than DA devices closer to the power source; and
recommending revised protection parameters.

11. The method as in claim 1, wherein the method is implemented by a computer selected from a group consisting of: a supervisory control and data acquisition (SCADA) device; a substation computer; and a plurality of distributed computer devices within the distribution feeder circuit.

12. An apparatus, comprising:
a processor adapted to execute one or more processes;
a network interface adapted to communicate with a plurality of distribution automation (DA) devices of a distribution feeder circuit in a power grid; and
a memory configured to store a process executable by the processor, the process when executed operable to:
identify a grid topology of a plurality of DA devices;
determine parameters for each of the DA devices of the distribution feeder circuit based on the grid topology;
configure the plurality of DA devices with respective parameters as determined;

detect a change of the grid topology; and
in response to the change of the grid topology:
i) determine updated parameters for one or more of the DA devices of the distribution feeder circuit based on the changed grid topology; and
ii) reconfigure respective parameters of each of the DA devices that have updated parameters due to the change of the grid topology.

13. The apparatus as in claim 12, wherein the parameters comprise protection parameters determined based on the grid topology such that DA devices further from a power source in the power grid up to a normally open point (NOP) are configured to trigger protection earlier than DA devices closer to the power source.

14. The apparatus as in claim 13, wherein the protection parameters comprise over-current curves selected from a group consisting of: predefined curves from which the protection parameters are determined; and dynamically determined curves that are downloaded to the DA devices.

15. The apparatus as in claim 12, wherein the process when executed to identify the grid topology is further operable to at least one of:
i) utilize a sensor on each of the plurality of DA devices to determine its location in the distribution feeder circuit in relation to other DA devices;
ii) determine an open/close state of each of the DA devices to determine one or more normally open points (NOPs); and
iii) utilize one or more probe messages on the distribution feeder circuit to determine a location in the distribution feeder circuit of each DA device in relation to other DA devices and to also determine one or more NOPs.

16. The apparatus as in claim 12, wherein the process when executed to detect the change is further operable to:
detect the change using a technique selected from a group consisting of: fault location, isolation, restoration (FUR) technology; renewable energy generation variation detection; and manual grid maintenance detection.

17. The apparatus as in claim 12, wherein the process when executed is further operable to:
detect a manual configuration of one or more of the parameters; and
verify the manually configured parameters based on the grid topology.

18. The apparatus as in claim 17, wherein the parameters comprise protection parameters determined based on the grid topology such that DA devices further from a power source in the power grid up to a normally open point (NOP) are configured to trigger protection earlier than DA devices closer to the power source, and wherein the process when executed is further operable to:
determine that the manual configuration of the protection parameters does not configure DA devices further from a power source in the power grid to trigger protection earlier than DA devices closer to the power source; and
in response, raise an alarm.

19. The apparatus as in claim 17, wherein the parameters comprise protection parameters determined based on the grid topology such that DA devices further from a power source in the power grid up to a normally open point (NOP) are configured to trigger protection earlier than DA devices closer to the power source, and wherein the process when executed is further operable to:
determine that the manual configuration of the protection parameters does not configure DA devices further from a power source in the power grid to trigger protection earlier than DA devices closer to the power source; and
in response, recommend revised protection parameters.

20. A tangible, non-transitory, computer-readable media having software encoded thereon, the software when executed by a processor operable to:
identify a grid topology of a plurality of distribution automation (DA) devices of a distribution feeder circuit in a power grid;
determine parameters for each of the DA devices of the distribution feeder circuit based on the grid topology;
configure the plurality of DA devices with respective parameters as determined;
detect a change of the grid topology; and
in response to the change of the grid topology:
i) determine updated parameters for one or more of the DA devices of the distribution feeder circuit based on the changed grid topology; and
ii) reconfigure respective parameters of each of the DA devices that have updated parameters due to the change of the grid topology.

21. The computer-readable media as in claim 20, wherein the parameters comprise protection parameters determined based on the grid topology such that DA devices further from a power source in the power grid up to a normally open point (NOP) are configured to trigger protection earlier than DA devices closer to the power source.

22. The computer-readable media as in claim 21, wherein the protection parameters comprise over-current curves selected from a group consisting of: predefined curves from which the protection parameters are determined; and dynamically determined curves that are downloaded to the DA devices.

23. The computer-readable media as in claim 20, wherein the software when executed by the processor to identify the grid topology is further operable to at least one of:
i) utilize a sensor on each of the plurality of DA devices to determine its location in the distribution feeder circuit in relation to other DA devices;
ii) determine an open/close state of each of the DA devices to determine one or more normally open points (NOPs); and
iii) utilize one or more probe messages on the distribution feeder circuit to determine a location in the distribution feeder circuit of each DA device in relation to other DA devices and to also determine one or more NOPs.

24. The computer-readable media as in claim 20, wherein the software when executed by the processor to detect the change is further operable to:
detect the change using a technique selected from a group consisting of: fault location, isolation, restoration (FUR) technology; renewable energy generation variation detection; and manual grid maintenance detection.

25. The computer-readable media as in claim 20, wherein the software when executed by the processor is further operable to:
detect a manual configuration of one or more of the parameters; and
verify the manually configured parameters based on the grid topology.

* * * * *